May 30, 1939.  S. A. PLATT  2,160,227
ELECTRIC HEATING DEVICE
Filed Aug. 6, 1936
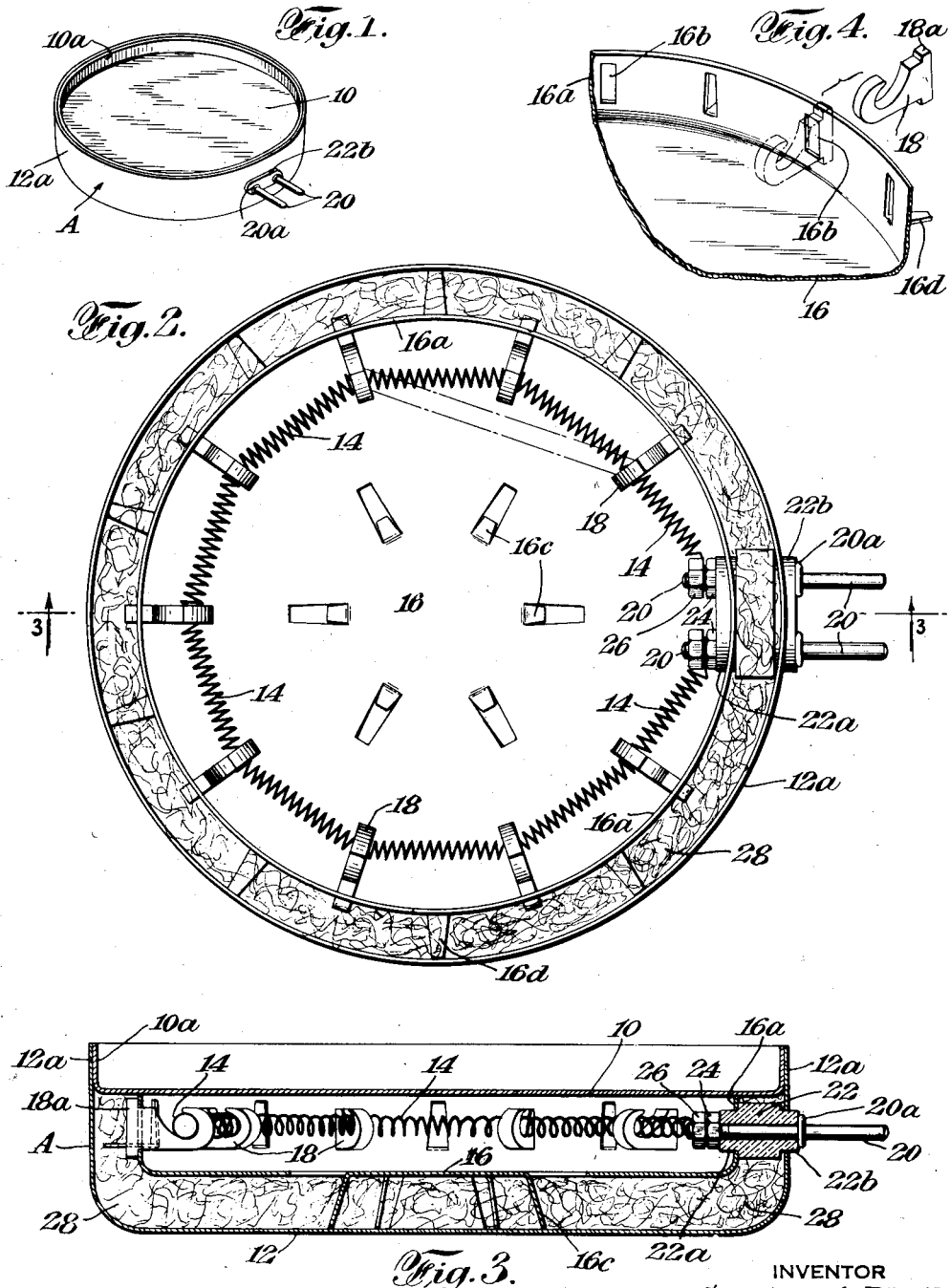
INVENTOR
Stephen A. Platt
BY
Prindle Bean & Mann
ATTORNEYS Patented May 30, 1939

2,160,227

UNITED STATES PATENT OFFICE 2,160,227

ELECTRIC HEATING DEVICE

Stephen A. Platt, Decatur, Ill., assignor to U. S. Manufacturing Corporation, Decatur, Ill., a corporation of Illinois Application August 6, 1936, Serial No. 94,555

4 Claims. (Cl. 219—37)

This invention relates to an improved construction for an electric heating device that is usable either in itself or incorporated with some other device employing an electric heating means, as for example, a corn popper.

Its object is to achieve an efficient heating device which shall also be simple to construct and assemble. Among the novel detail features are the means for insulatingly supporting the heating-coil in connection with the device; also the combining of the heating-coil and its supports with a pen which constitute a self-contained heating unit; also the means for supporting and spacing said resistance-coil-pan essentially concentrically within the casing of the device and above the bottom thereof.

With these and other objects in view as may hereinafter appear, my invention consists in the construction, arrangement and combination of parts hereinafter described and then sought to be defined in the claims, reference being had to the accompanying drawing which shows, for the purpose of illustrative disclosure a preferred embodiment of my invention, it being understood however, that various changes may be made in practise within the scope of the claims without digressing from my inventive idea.

In the drawing:

Fig. 1 is a perspective view of the heating device on a reduced scale compared with the other figures;

Fig. 2 is a plan view looking down on the device after the cover or upper pan has been removed;

Fig. 3 is a vertical sectional view on the line 3—3 of Fig. 2 looking in the direction of the arrows; and Fig. 4 is a perspective view of a fragment of the heating-coil supporting pan and one of the brackets.

In the illustrative device of the drawing, the casing A of the heating device consists of the telescoped pans 10 and 12, the cylindrical wall 10a of the upper pan being seated or telescoped snugly in the cylindrical mouth 12a of the lower pan. The heating element proper consists of a length of coiled resistance wire 14 supported within a pan 16 from the wall or rim 16a thereof on the supporting parts 18 which may take the form of hooks, brackets or the like.

All of the pans 10, 12 and 16 are preferably spun or stamped from sheet metal. The heating coil 14 may be made of nichrome resistance wire.

The hooks or brackets 18 are made of any heat-resistant, electrical insulating material and project radially inwardly through slots 16b in the wall or rim of the pan 16. A shouldered base 18a on said hooks or brackets is larger than the slots to prevent them from being drawn or passed through the slots.

The ends of the heating coil 14 are secured as shown to the inner ends of the electrical plug terminals 20—20. These latter are supported in parallel holes or bores through the bushing 22. This bushing is made of heat-resistant, electrical insulating material and has cross-sectionally reduced ends 22a and 22b. The end 22a projects into an opening just large enough to receive it in the wall of the pan 16, as best shown in Fig. 3, and the other end 22b of the bushing similarly projects into an opening in the wall 12a of the pan 12. This Figure 3 also shows how each plug terminal 20 may be anchored in the insulating bushing 22 by being formed with a shoulder or collar 20a engaging the outer end of the bushing, and by having a nut 24 on its screw-threaded inner end so that said nut can engage the bushing at its inner end. A second nut 26 is provided so that the ends of the resistance coil 14 can be clamped between the nuts 26 and 24 and thereby conductibly secured to the plug terminals 20.

Figs. 2 and 3 show how the described insulating hooks 18 and the described attachments to the plug terminals 20 suspend the heating coil 14 peripherally within the supporting metal pan 16 out of electrical contact with the pan. The tension of the somewhat stretched heating coil pulls and tensions the hooks inwardly until their shouldered bases 18a abut against the wall of the pan.

16c are lugs struck out from the bottom of said pan 16 serving as legs to support the pan as shown in Fig. 3 in spaced relation above the bottom of the pan 12.

16d are lugs struck out from the side wall of the pan 16 serving as arms to keep the pan 16 spaced concentrically within the pan 12. The space between the bottoms of these pans and the annular space between their sides is packed with rock wool insulation 28 or with some other suitable heat-insulating material which will substantially prevent downward radiation of the heat from the heating coil chamber and direct it upwardly against the bottom of the pan 10.

The shallow pan 10 which may otherwise be described as a rimmed disk forms the hot plate or top of the device.

The foregoing constitutes an electrical heating device which is usable in many ways. Thus it may be used by itself, or it may be built into some other device. For example, it may be substituted for the heating device illustrated in the corn popper of my own U. S. Patent No. 2,034,190 dated March 17, 1936.

I have illustrated and described a preferred and satisfactory embodiment of my invention but it will be understood that changes may be made therein within the spirit and scope thereof as set forth herein and defined in the appended claims.

What I claim is:

1. In a device of the character described, in combination, a metallic pan-shaped element having an upstanding edge provided with a plurality of openings, a support made of insulating material positioned in each opening and having a part extending within said pan-shaped element, a resistance wire held by said supports within said pan-shaped element, a larger pan-shaped element within which said first-mentioned pan-shaped element rests, means for spacing said two pan-shaped elements apart, a third pan-shaped element telescopically fitting within the larger pan-shaped element with its bottom resting upon the top edge of the first-mentioned pan-shaped element, said spacing means including lugs struck down from the central portion of said first-mentioned pan-shaped element and other lugs struck outwardly from the upstanding edge of said first-mentioned pan-shaped element.

2. In a device of the character described, in combination, a metallic pan-shaped element having an edge wall, a length of heating coil, a plurality of insulating brackets supported in said edge wall and in turn supporting and insulating said length of heating coil within said pan-shaped element, a larger pan-shaped element within which said first-mentioned pan-shaped element is positioned, a plurality of lugs stamped from the bottom of said first-mentioned pan-shaped element to form supporting legs to engage the second-mentioned pan-shaped element and support the pan-shaped elements in spaced relation to each other, and heat insulating material packed into the space between the sides and bottoms of said two pan-shaped elements.

3. In a device of the character described, in combination, a metallic pan-shaped element having an edge wall, a length of heating coil, a plurality of insulating brackets supported in said edge wall and in turn supporting and insulating said length of heating coil within said pan-shaped element, a larger pan-shaped element within which said first-mentioned pan-shaped element is positioned, and a plurality of lugs stamped out from the side wall of said first-mentioned pan-shaped element to form outwardly projecting arms to engage the side wall of the second pan-shaped element for spacing said pan-shaped elements from each other at the sides thereof.

4. In an electrical heating device, the combination of a metal pan, a length of heating coil, a plurality of insulating brackets supported by said pan and in turn supporting and insulating said length of heating coil within said pan, another metal pan larger in diameter and deeper than the aforesaid heating-coil-pan and containing same, there being heat insulating material packed into the space between the sides and bottoms of the two pans, and lugs integral with the bottom of the heating-coil-pan in the form of supporting legs, and other lugs integral with the side wall of the heating-coil-pan in the form of outwardly projecting arms for spacing the pans from each other at the sides.

STEPHEN A. PLATT.